(12) United States Patent
Haustein (10) Patent No.: US 6,785,697 B2
(45) Date of Patent: Aug. 31, 2004

(54) STORAGE RECLAMATION ON TAPE MANAGEMENT SYSTEMS

(75) Inventor: Nils Haustein, Zornheim (DE)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 10/037,265

(22) Filed: Jan. 2, 2002

(65) Prior Publication Data

US 2002/0156968 A1 Oct. 24, 2002

(30) Foreign Application Priority Data

Mar. 1, 2001 (EP) .............................................. 01100249

(51) Int. Cl.[7] .............................................. G06F 17/30
(52) U.S. Cl. ..................................................... 707/206
(58) Field of Search ................................ 707/200, 205, 707/206

(56) References Cited

U.S. PATENT DOCUMENTS 6,304,880 B1 * 10/2001 Kishi ......................... 707/200

* cited by examiner

*Primary Examiner*—Jack A. Lane
(74) *Attorney, Agent, or Firm*—Ron Feece; William D. Gill (57) ABSTRACT

A method for managing storage reclamation on a tape management system is provided. The method allows the calculation of the optimum reclamation threshold value for a given system, thereby increasing the performance of the system drastically.

12 Claims, 7 Drawing Sheets

STORAGE RECLAMATION ON TAPE MANAGEMENT SYSTEMS

FIELD OF THE INVENTION

The present invention relates in general to data storage and processing. More specifically, the invention relates to free space management (reclamation).

BACKGROUND OF THE INVENTION

In hierarchical computer storage systems, intensively used and fast memories are paired with arrays of slower and less frequently accessed devices. One example of high-speed, expensive memory is a direct access storage device file buffer (DASD). Slower memory devices include tape drives and disk drive arrays, which are less expensive than a DASD.

One such hierarchical storage system is a virtual tape storage system (VTS). A VTS includes a plurality of tape devices and tape cartridges. During operation, the VTS is writing data from a host (logical volumes) to the numerous tape devices onto physical tapes on the system. Multiple logical volumes (or Data Sets) are written to one physical tape (Volume Stacking). Tapes having at least 1% of data written thereon are called private tapes.

The data on tapes managed by such tape management systems can be classified into two groups, namely a) active data, i.e., data which is still valid or has not expired yet, and b) inactive data, i.e., data which has expired. Data may expire because an expiration time or date was assigned to the volume at creation, or because it is replaced by a more recent version stored on the system.

As data expire, some tapes are left containing only a small fraction of data that is still current. Since tapes are sequential access storage devices, the inactive data on a tape can only be removed if the entire tape gets rewritten. However, the inactive data on tapes brings inefficiency to the entire system. The more inactive data that is on a tape, the more tapes are needed. In order to optimize the number of tapes being used, the tapes with a relative high amount of inactive data must be copied to other, empty tapes, which are called scratch tapes. This process, in some tape management systems, is called reclamation. However, in order to perform such a reclamation process effectively, a value is needed which defines when a tape is a candidate for reclamation, i.e., a candidate for the data to be copied to a scratched tape. This value is called reclamation threshold. If the percentage of inactive data on a tape is higher than the reclamation threshold assigned, or, in other words, if the percentage of active data on the tape is lower than the reclamation threshold, this tape is a candidate for reclamation.

It has been proposed to provide an automated reclamation scheduling method for managing storage on a virtual tape server. Where reclamation-off times are set by a user, an automated administrator may override the settings depending on the number of scratch tapes that are available. The fewer the scratch tapes that remain available, the more frequently storage reclamation will be performed in the reclamation schedule set by an automated administrator. The proposed method comprises the steps of performing reclamation according to reclamation-off times when the number of scratch tapes is between a first and a second threshold. These values, however, do not give an exact value for the reclamation threshold itself, i.e., they do not define if a specific tape is a candidate for reclamation or not.

In order to perform an effective and user-friendly reclamation process, it is, however, important to know to which value the reclamation threshold itself should be set. In case it is set to a constant value of, e.g., 20%, this would mean that tapes having an amount of less or equal to 20% active data written thereon are candidates for reclamation. This may work in cases where the data expiration has short cycles. In case the expiration cycles are long, it may occur that almost all tapes have about 50% active data, and the system will run out of scratch tapes.

Another example may be that the reclamation threshold is set to a constant value of 80%, in which case tapes having an amount of less than or equal to 80% active data would be candidates for reclamation. Note, almost all private tapes in a system are candidate for reclamation in this case. This would mean that, normally, there are always enough scratch tapes available. The disadvantage, however, is, that the system is continuously busy with reclamation, i.e., eats up ressources, and the tapes are being used too frequently, this has a negative influence on the tape life time.

Therefore, it does not make any sense to set the reclamation value to a constant value. Rather, it is required to calculate and apply the optimum value for a system on a periodic basis.

SUMMARY OF THE INVENTION

It is therefore an object of the present invention to provide a method for managing free storage (reclamation) on a tape management system (like virtual tape server) that will overcome the above mentioned disadvantages of the prior art.

This object is achieved by the method disclosed in claim 1 and the system disclosed in claim 9. Advantageous embodiments of the invention are disclosed in the dependent claims.

BRIEF DESCRIPTION OF THE DRAWINGS

The invention will be described hereinafter in more detail in conjunction with the accompanying drawings, in which.

DETAILED DESCRIPTION OF THE PREFERRED EMBODIMENT

The present invention for the calculation of the optimum reclamation threshold value is based on two prerequisites, namely a) the active data distribution on all tapes present in the storage management system, and b) the ratio of private to scratch tapes. There is a linear function between active data distribution, total number of tapes and the number of scratch tapes from which the optimum reclamation threshold value can be derived.

As has already been explained above, private tapes are tapes having at least 1% active data written on it. Scratch tapes, on the other hand, are empty tapes, ready to receive data. The sum of private and scratch tapes reflects the total number of tapes present in the overall system.

Figure 1:
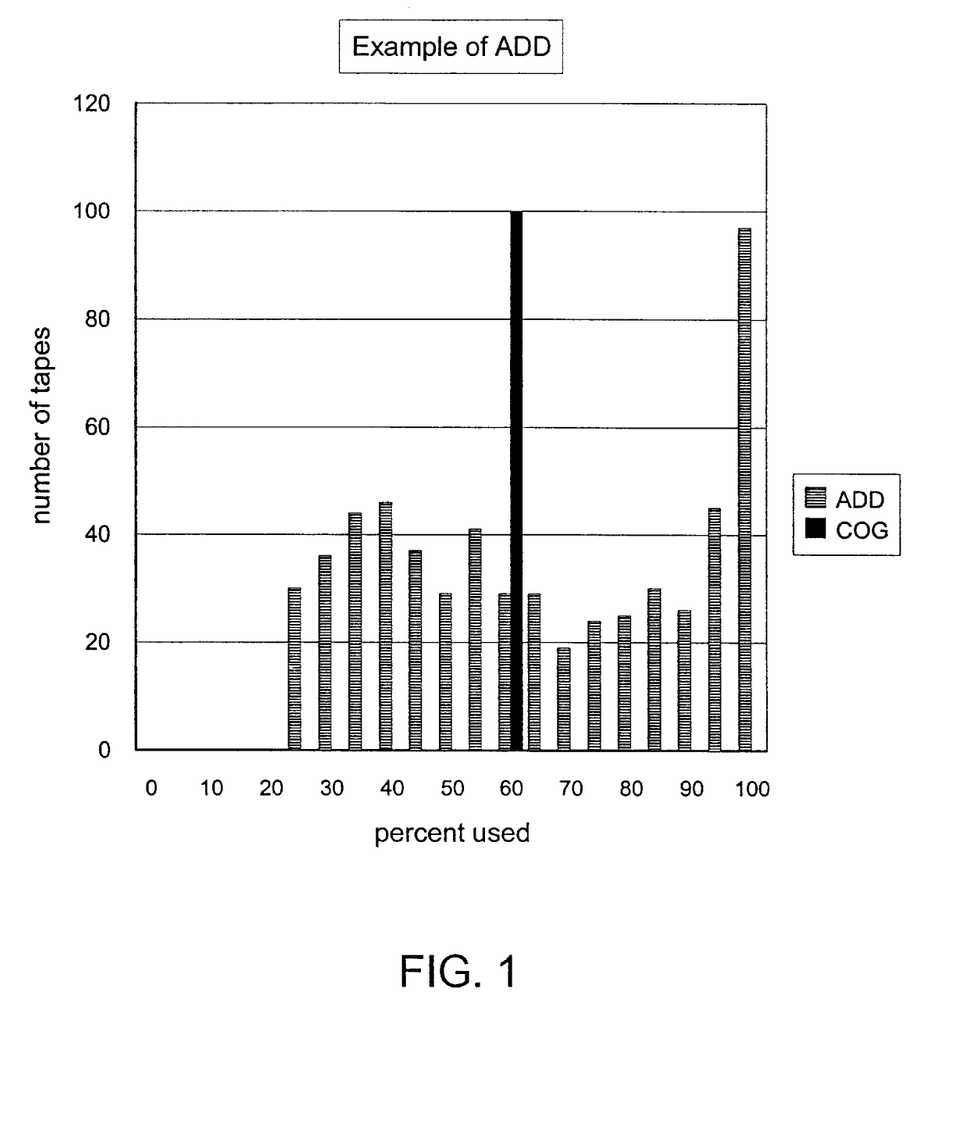
FIG. 1 is an example of active data distribution throughout the system.

The active data distribution (hereinafter called "ADD") reflects the distribution of active data on all private tapes. It can be mapped, e.g., in a bar chart, in which the X-axis represents the percentage of active data and the Y-axis represents the number of tapes. One bar in such a chart then shows the number of tapes that have a certain percentage of active data on it. To simplify the bar chart, the amount of active data can be rounded up to the next 5% step. FIG. 1 shows an example of active data distribution throughout a system.

In order to express the entire active data distribution as a sharp value, it is possible to calculate the Center of Gravity (cog) of the ADD, i.e., the bar chart. The center of gravity can be derived from any ADD, if it is mapped into a bar chart, using simple algorithm.

It is furthermore assumed that the calculation of the reclamation threshold is based on meaningful values as, e.g., the ratio between private and scratch tapes being equal to or less than 1, otherwise the calculated threshold will be 0. Another meaningful value is the fact that there are tapes in the system to be calculated, otherwise the calculated threshold will be 0 as well. A value of 0 means that the system does not need to perform any reclamation (free space management).

A linear and a quadratic approach can be used to calculate the reclamation threshold as will be demonstrated follows.

The linear approach suggests that the reclamation threshold is directly proportional to the ADD and indirectly proportional to the ratio between scratch and private tapes. The reclamation threshold can then be calculated as shown in formula (1):

$$rec = cog(1-r) \quad (1)$$

wherein cog is the center of gravity of the respective ADD, thus representing active data distribution, and r represents the ratio of scratch to private tapes. The ratio r can be calculated as $$r = \frac{\text{number of scratch tapes}}{\text{total number of tapes} - \text{number of scratch tapes}}$$

Figure 2:
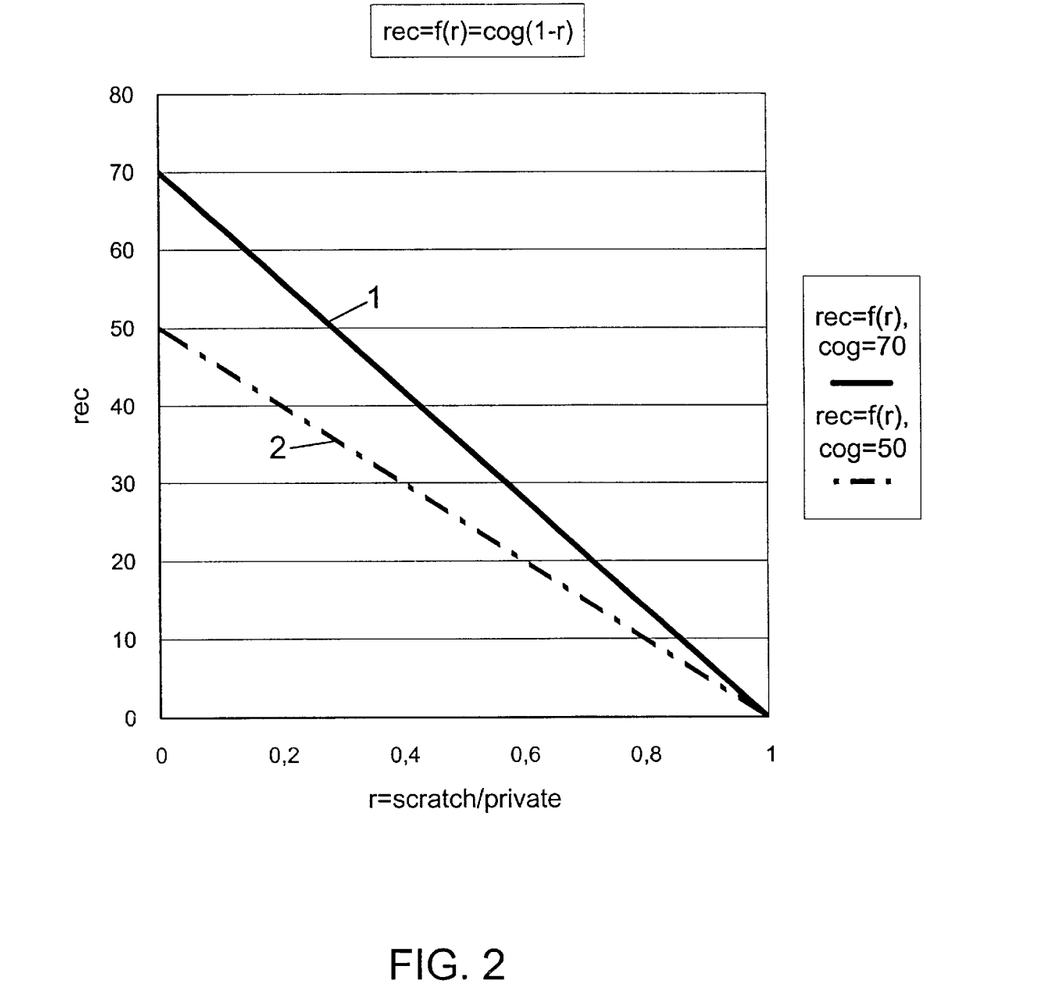
FIG. 2 shows an example of a linear dependency of the reclamation threshold on the ratio of scratched and private tapes according to the invention.

FIG. 2 shows an example of a linear dependency of the reclamation threshold on the ratio of scratched and private tapes according to the invention. Two curves are shown for values of cog being 70 (curve 1) and 50 (curve 2).

The center of gravity for a given ADD is constant, as well as the ratio r. It may, however, vary from day to day and from system to system.

This linear function may be optimized using an offset factor. This offset factor reflects the sensible number of scratch tapes, relative to the total number of tapes. In other words, if a sensible number of scratch tapes is reached, e.g., 1/10th of the total number of tapes, the offset factor will adjust the calculated value. The adjustment in this case would result in a decrease of the reclamation threshold, i.e., less reclamation is needed (because there are enought scratch tapes available). The decrease of the calculated reclamation factor is done in 5% steps. The formula for the offset factor is given below:

$$\text{offs fact} = (1 - (num\_scr/opt) * 0.05) \quad (2)$$

wherein opt represents the optimum number of scratch tapes (in the present example total number of tapes/10), and num__scr represents the actual number of scratched tapes. Now, combining the two equations (1) and (2), the following formula is derived:

$$rec = cog(1-r) * (1 - (num\_scr/opt) * 0.05) \quad (3)$$

wherein rec is the reclamation value given in %; cog is the center of gravity, representing ADD, r is the ratio of scratch to private tapes, opt defines the sensible number of scratch tapes (which, in this special case, is the total number of tapes/10), and num__scr is the actual number of scratch tapes.

The offset factor can also incorporate other system parameters, like the number of free tape drive resources, or the system usage.

As has already been mentioned, a quadratic approach may also be used:

$$rec = cog(1 - r*r) \quad (4)$$

The offset factor given in the linear function may also apply here.

Figure 3:
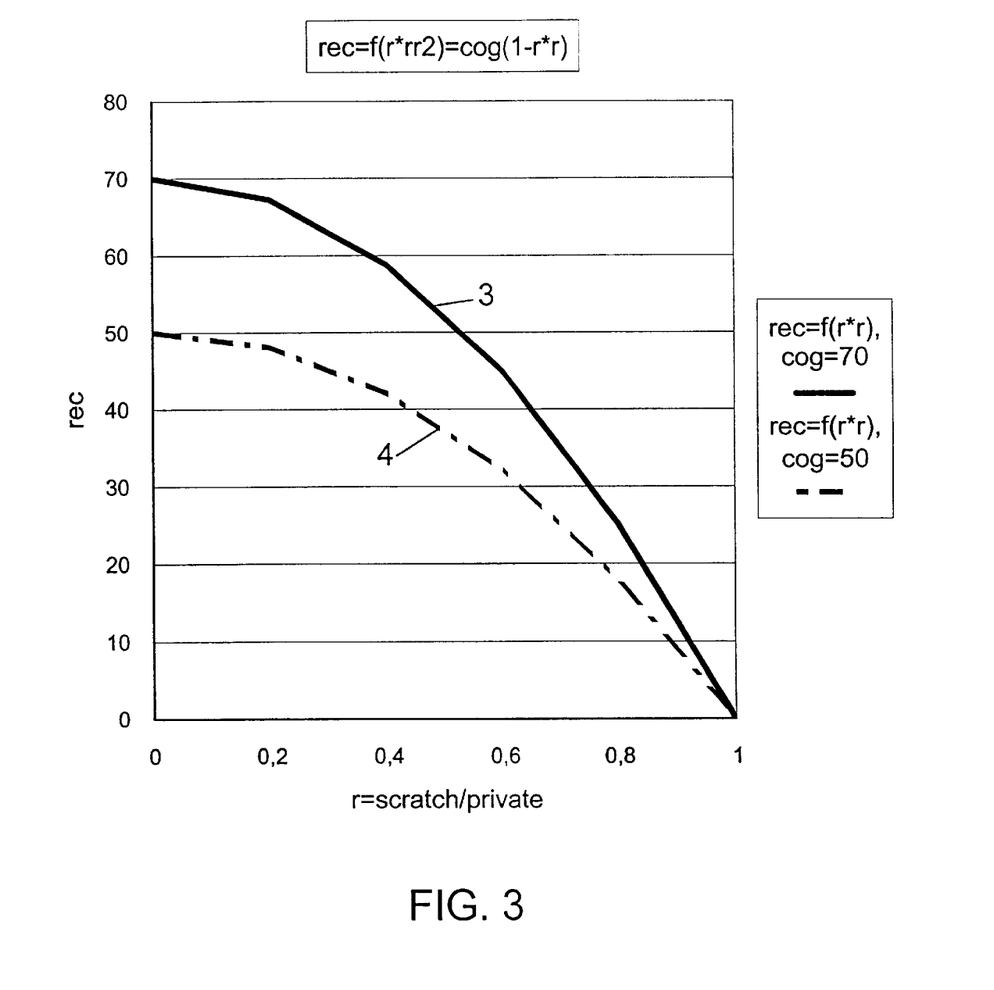
FIG. 3 shows an example of a quadratic dependency of the reclamation threshold on the ratio of scratched and private tapes according to the invention.

The quadratic dependency of the reclamation threshold on the given parameters is shown in FIG. 3 where in curve 3 the cog value is 70 and in curve 4 the cog value amounts to 50.

It has to be noted that the values calculated by the given formulae can also be interpreted as a number characterizing the average ADD; a number describing whether the system is running into a shortage of scratched tapes; or a number which reflects the balance of private tapes to scratch tapes in a given system.

In order to utilize the given mathematical formulae to calculate the reclamation threshold for a given system, an application program can be implemented. The program can, e.g., be run on a VTS system to determine the optimum reclamation threshold using the data in the batelogs, thereby only needing the ADD and the number of scratch tapes. Such a system is described as follows.

A virtual tape server (VTS) is operatively coupled to a host computer. The host computer communicates with a host-to-data interface within the virtual tape server. The host-to-data interface, such as IBM's Enterprise Systems Connection (ESCON), may be a fiber optic local area network used to link mainframes to disk drives or other mainframes. From the host computer, tape daemons may appear to be multiple tape devices attached to the host-to-data interface, or ESCON. The VTS may also includes a direct access storage device (DASD) cache, a plurality of tape devices within an automated library, and a storage manager. One example of a tape device that could be used is IBM 3590 tape cartridge. Within the automated library, an accessor, or robot, puts tapes into one of the tape drives when a tape is requested.

The storage manager, such as the Adstar® Distributed Storage Manager (ADSM) by IBM, is in control of moving data from the DASD to tapes. The storage manager may include an ADSM server and an ADSM hierarchical storage manager client.

Alternatively, the server and client could each be an ADSM system. The storage manager may further include a command interface and a console output.

A VTS automated administrator, such as an automated ADSM administrator for the VTS, may be the component responsible for the calculation of the reclamation threshold according to the present invention. A reclamation subsystem may carry out these functions within the automated administrator.

The automated administrator controls the operations of the DASD through the hierarchical storage manager (HSM) client. A library manager communicates with the automated administrator.

An examplary syntax of a program to carry out the method according to the invention is given below:

*calc_recl -a -l <batelog> -f <actdatafile> [-o 1-2-3-outfile]* wherein -a automatically picks the most current batelogs; -l picks the ADD and number of scratch tapes from the batelog specified; -f picks ADD and the number of scratch tapes from a given file (here called ADD file, the structure of which will be explained below, this makes the program work in a non-VTS environment). Optionally, -o may generate a formatted output file of ADD and recl values to be imported into, e.g., Lotus 1-2-3.

Even one of the arguments -a; -l <batelog>; -f <actdatafile> must be used. Those arguments specify from where the program will obtain the required data.

The calculation of the reclamation threshold can be done in a one day period. In some cases it could make sense to extend this period, e.g., if the calculated optimum reclamation threshold does not change over a period of 4 days.

It is to be understood that the program given above is only one example and that the invention is not restricted to this program.

The ADD file structure given in the above program consists of 21 line-by-line entries specifying the active data distribution. The -l and -a option will generate this file implicitly. If the -f parameter is specified, a file with the following structure must be given:

| | |
|---|---|
| #ScratchCount = 20 | // keyword,,#ScratchCount=", specifies the number of scratch tapes |
| 5 | //number of tapes filled 5% |
| 10 | //number of tapes filled 10% |
| 15 | //number of tapes filled 15% |
| ... | |
| ... | |
| 100 | //number of tapes filled 100% |

The 1-2-3 output file contains the active data distribution and the calculated reclamation values in the respective position.

This file is generated by the program if the option -o is specified. The file is designed like as table having 5 columns and 21 rows with the following meaning:

Column 1 contains numbers from 0 to 100 in +5 steps. Those numbers represent percent. The row with 0 means 0% filled and specifies the number of scratch tapes, and so on.

Column 2 contains the number of tapes filled with percents specified at the beginning of the row (see column 1)

Column 3 contains the linear reclamation value with offset (recl_lin_offset)

Column 4 contains the linear reclamation value without offset (recl_lin)

Column 5 contains the quadratic reclamation value with offset (recl_quad_offset)

Column 6 contains the quadratic reclamation value with offset (recl_quad)

The reclamation values are placed in the row which represents the closest percentage of the calculated value.

Examples of reclamation threshold values calculated according to the present invention are given in FIGS. 4 to 7.

Figure 4:
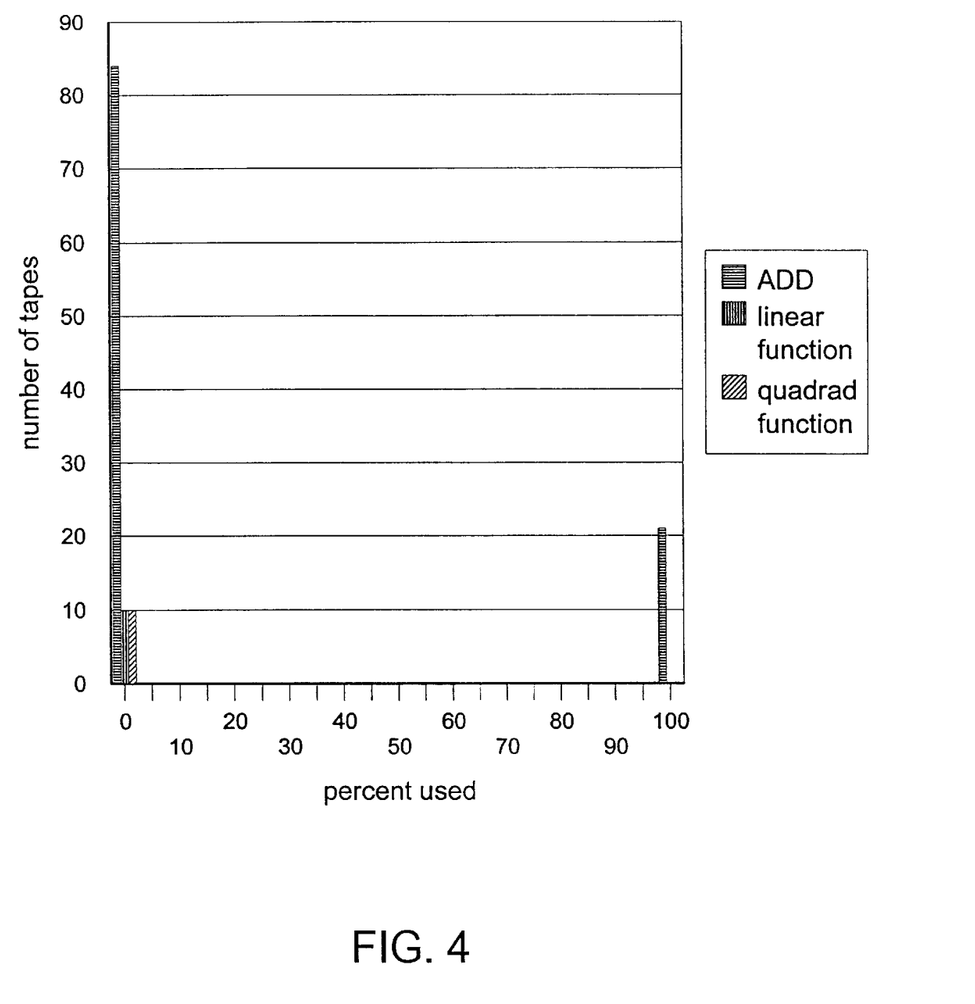
FIGS. 4 to 7 show examples for reclamation threshold values derived from the present invention.

FIG. 4 is a sample taken from a storage management system where all private tape are utilized 100%, i.e. have 100% active data and 0% inactive data. Since there are enought scratch tapes available (tapes with active data of 0%) the value calculated is 0, i.e. no free space management (reclamation) is necessary.

Figure 5:
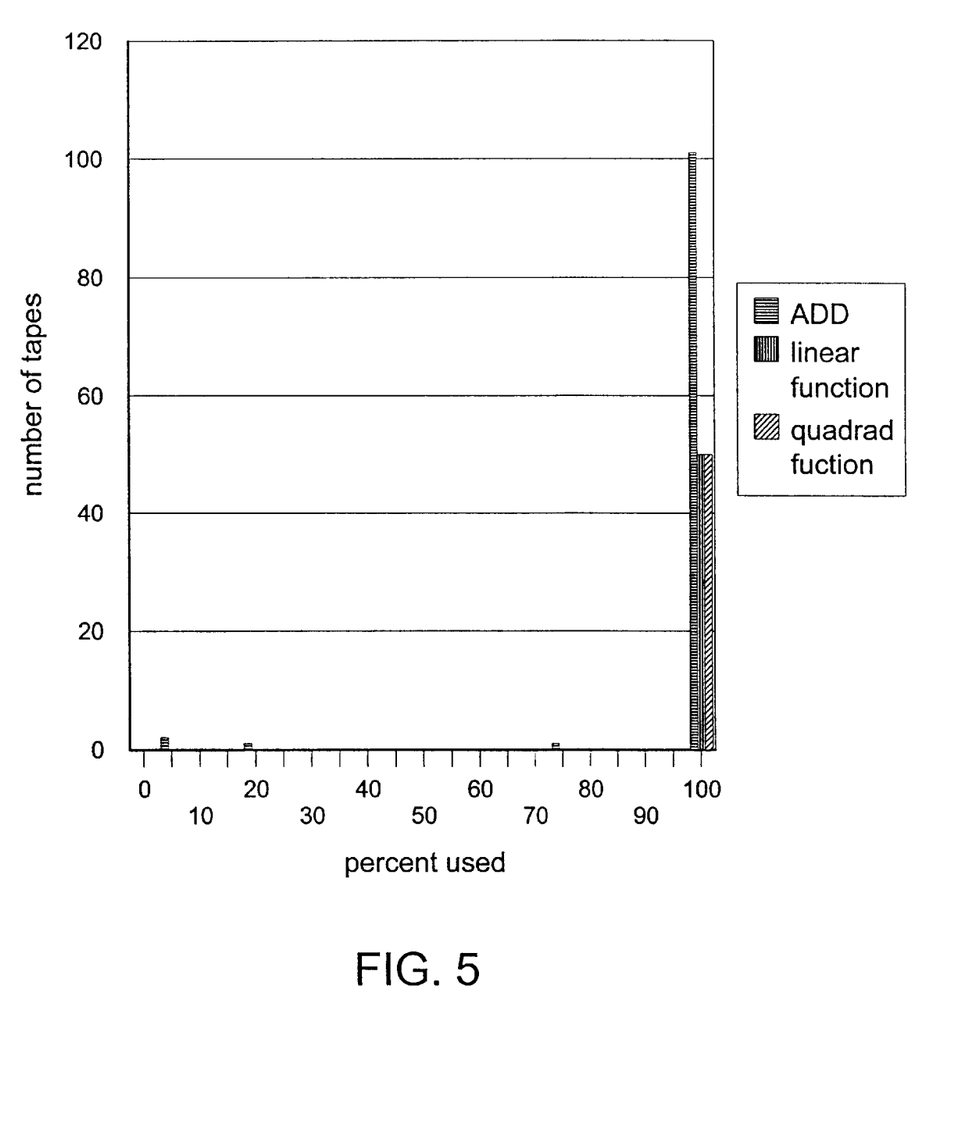

FIG. 5 shows that all tapes in the system are filled 100%, i.e. have 100% active data. There are no scratch tapes available in this example. For that the calculated value is 100%, i.e. all tapes in this storage management system are candidate for reclamation.

Figure 6:
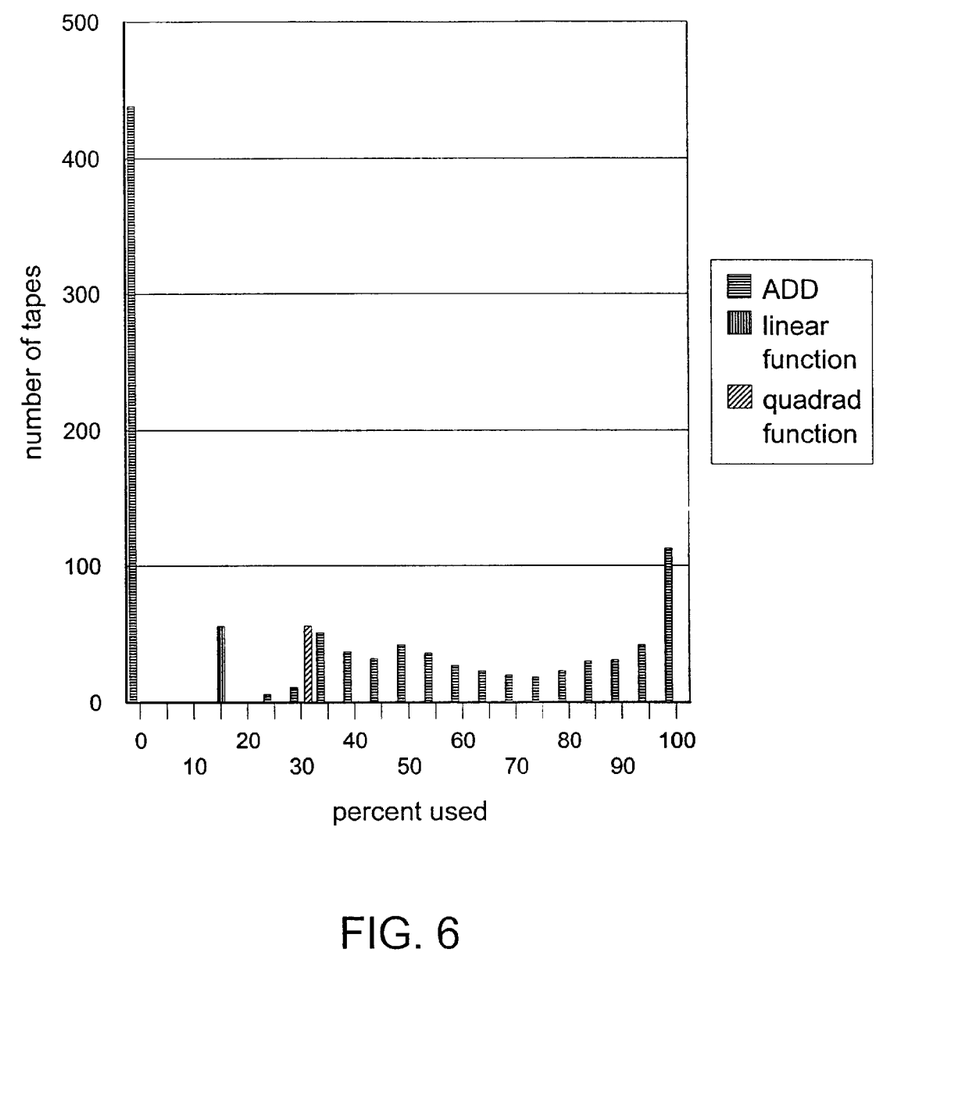

FIG. 6 is showing enought scratch tapes available (tapes filled 0%). For that the calculated value is expected to be low. The linear function shows a value of 15%. Since there are no tapes utilized less than 15% the system will not perform free space management (reclamation). The quadrad function shows a value of 30%. There are just a few tapes which will be reclaimed here.

Figure 7:
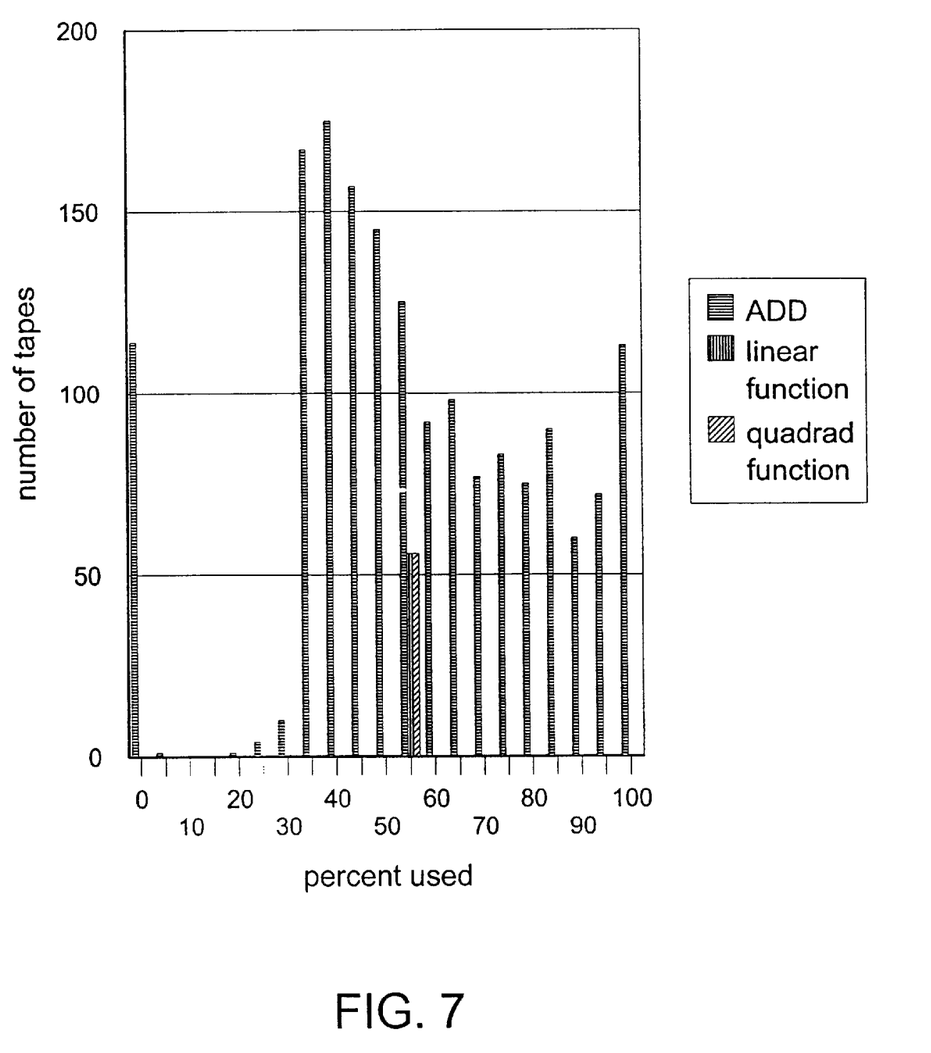

FIG. 7 is showing a system where many tapes are utilized low, i.e. less than 50%. The number of scratch tapes (tapes utilized 0%) is also fairly low compared to the number of private tapes. The calculated value is at about 55%. Both values (linear and private) are the same. As more tapes become scratch as lower the value will drop by the time.

The present invention allows the calculation of the optimum reclamation threshold value for a given system, thereby increasing the performance of the system drastically.

What is claimed is:

1. A method for managing storage reclamation on a tape management system having a plurality of tape devices, a number of scratch tapes, and a number of private tapes, said method comprising the steps of:

a) receiving the active data distribution on all tapes from the tape management system;

b) calculating the center of gravity for the active data distribution;

c) obtaining the number of scratch and private tapes from the tape management system;

d) calculating the ratio of scratch tapes to private tapes; and e) calculating a reclamation threshold as a function of the values provided in steps a) to d).

2. Method according to claim 1, wherein said function is a linear function.

3. Method according to claim 1, wherein said function is a quadratic function.

4. Method according to claim 1, wherein said tape management system is a virtual tape server (VTS).

5. Method according to claim 1, wherein said function additionally includes an offset factor.

6. Method according to claim 5, wherein said offset factor represents the optimum number of scratch tapes.

7. Method according to claim 6, wherein said optimum number of scratch tapes is 1/10 of the total number of tapes in the system.

8. Method according to claim 1, wherein said ratio of scratch tapes to private tapes is equal or less than 1.

9. Method according to claim 1, wherein said center of gravity is constant for a given data distribution.

10. A storage reclamation management system on a tape management system having a number of scratch tapes and a number of private tapes, the system comprising:

a) a plurality of tape devices;

b) means for providing the active data distribution on all tapes present in the tape management system;

c) means for obtaining the number of scratch and private tapes from the tape management system;

d) means for calculating the center of gravity for said active data distribution;

e) means for calculating the ratio of scratch tapes to private tapes; and f) means for calculating a reclamation threshold as a function of the values provided in steps b) to e).

11. The system according to claim 10, wherein said tape management system is a virtual tape server (VTS).

12. A computer program product stored on a computer usable medium, comprising computer readable instructions for:
   a) receiving the active data distribution on all tapes from the tape management system;
   b) calculating the center of gravity for the active data distribution;
   c) obtaining the number of scratch and private tapes from the tape management system;
   d) calculating the ratio of scratch tapes to private tapes; and
   e) calculating a reclamation threshold as a function of the values provided in steps a) to d).

* * * * *